United States Patent
Kurian

(10) Patent No.: US 11,354,672 B2
(45) Date of Patent: *Jun. 7, 2022

(54) SYSTEM FOR SECURE ROUTING OF DATA TO VARIOUS NETWORKS FROM A PROCESS DATA NETWORK

(71) Applicant: Bank of America Corporation, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 492 days.

This patent is subject to a terminal disclaimer.

(21) Appl. No.: 16/594,516

(22) Filed: Oct. 7, 2019

(65) Prior Publication Data

US 2020/0034841 A1 Jan. 30, 2020

Related U.S. Application Data

(63) Continuation of application No. 15/086,619, filed on Mar. 31, 2016, now Pat. No. 10,438,209.

(Continued)

(51) Int. Cl.
*G06Q 20/40* (2012.01)
*G06Q 10/10* (2012.01)
(Continued)

(52) U.S. Cl.
CPC ......... *G06Q 20/405* (2013.01); *G06Q 10/105* (2013.01); *G06Q 20/065* (2013.01);
(Continued)

(58) Field of Classification Search
None
See application file for complete search history.

(56) References Cited

U.S. PATENT DOCUMENTS 5,671,283 A 9/1997 Michener et al.
5,835,599 A 11/1998 Buer
(Continued)

FOREIGN PATENT DOCUMENTS

WO 2014162296 A1 10/2014
WO 2015135018 A1 9/2015

OTHER PUBLICATIONS

Greenspan, MultiChain Private Blockchain—White Paper, Jul. 2015, pp. 1-17 (Year: 2015).*

(Continued)

*Primary Examiner* — Steven S Kim
*Assistant Examiner* — Jason B Fenstermacher
(74) *Attorney, Agent, or Firm* — Moore & Van Allen PLLC; Nicholas C. Russell

(57) ABSTRACT

Embodiments enable a block chain distributed network arrangement system for facilitating a tiered dedicated block chain configuration to provide differing combinations of functions and levels of security. The system may identify factors within received information that indicate which dedicated block chain network should be used to record the received information. The dedicated block chains may be tiered based on the importance of the received information or a customer service level of a party associated with the received information. The system allows for recording of the received information in a distinct, dedicated block chain network that is appropriately configured for the functionality and/or security requirements of the received information.

20 Claims, 10 Drawing Sheets

Related U.S. Application Data

(60) Provisional application No. 62/293,585, filed on Feb. 10, 2016.

(51) Int. Cl.
  *G06Q 20/06* (2012.01)
  *G06Q 20/32* (2012.01)
  *H04L 9/32* (2006.01)
  *H04L 9/40* (2022.01)

(52) U.S. Cl.
  CPC ....... *G06Q 20/3223* (2013.01); *H04L 9/3239* (2013.01); *H04L 63/12* (2013.01); *H04L 2209/38* (2013.01); *H04L 2209/56* (2013.01)

(56) References Cited

U.S. PATENT DOCUMENTS

| | | |
|---|---|---|
| 6,073,234 A | 6/2000 | Kigo et al. |
| 6,324,286 B1 | 11/2001 | Lai et al. |
| 6,725,303 B1 | 4/2004 | Hoguta et al. |
| 6,850,252 B1 | 2/2005 | Hoffberg |
| 6,973,187 B2 | 12/2005 | Gligor et al. |
| 7,055,039 B2 | 5/2006 | Chavanne et al. |
| 7,092,400 B2 | 8/2006 | Malzahn |
| 7,184,549 B2 | 2/2007 | Sorimachi et al. |
| 7,502,933 B2 | 3/2009 | Jakobsson et al. |
| 7,574,401 B1 | 8/2009 | Burns |
| 7,979,889 B2 | 7/2011 | Gladstone et al. |
| 8,302,153 B1 | 10/2012 | Garrity et al. |
| 8,396,209 B2 | 3/2013 | Schneider |
| 8,416,947 B2 | 4/2013 | Schneider |
| 8,458,461 B2 | 6/2013 | Tardo |
| 8,464,320 B2 | 6/2013 | Archer et al. |
| 8,516,266 B2 | 8/2013 | Hoffberg et al. |
| 8,590,055 B2 | 11/2013 | Yoon et al. |
| 8,737,606 B2 | 5/2014 | Taylor et al. |
| 8,942,374 B2 | 1/2015 | Fujisaki |
| 8,983,063 B1 | 3/2015 | Taylor et al. |
| 9,059,866 B2 | 6/2015 | Bar-Sade et al. |
| 9,083,702 B2 | 7/2015 | Wied et al. |
| 9,092,766 B1 | 7/2015 | Bedier et al. |
| 9,298,806 B1 | 3/2016 | Vessenes et al. |
| 9,319,469 B2 | 4/2016 | Ruhlen et al. |
| 9,635,000 B1 | 4/2017 | Muftic |
| 9,672,499 B2 | 6/2017 | Yang et al. |
| 9,805,213 B1 | 10/2017 | Kragh |
| 2003/0126094 A1 | 7/2003 | Fisher et al. |
| 2004/0172535 A1 | 9/2004 | Jakobsson et al. |
| 2005/0256802 A1 | 11/2005 | Ammermann et al. |
| 2006/0053296 A1 | 3/2006 | Busboom et al. |
| 2006/0059539 A1 | 3/2006 | Shashikumar et al. |
| 2007/0106582 A1 | 5/2007 | Baker et al. |
| 2009/0281948 A1 | 11/2009 | Carlson |
| 2010/0279653 A1 | 11/2010 | Poltorak |
| 2011/0078073 A1 | 3/2011 | Annappindi |
| 2011/0197064 A1 | 8/2011 | Garcia et al. |
| 2012/0066121 A1 | 3/2012 | Shahbazi et al. |
| 2012/0284175 A1 | 11/2012 | Wilson et al. |
| 2013/0198061 A1 | 8/2013 | Dheer et al. |
| 2013/0232056 A1 | 9/2013 | Schulman |
| 2013/0311375 A1 | 11/2013 | Priebatsch |
| 2014/0006185 A1 | 1/2014 | Zurn et al. |
| 2014/0089243 A1 | 3/2014 | Oppenheimer |
| 2014/0310171 A1 | 10/2014 | Grossman et al. |
| 2015/0052587 A1 | 2/2015 | O'Neill et al. |
| 2015/0172053 A1 | 6/2015 | Schwarz et al. |
| 2015/0206106 A1 | 7/2015 | Yago |
| 2015/0242605 A1 | 8/2015 | Du et al. |
| 2015/0254446 A1 | 9/2015 | LaCous et al. |
| 2015/0332283 A1* | 11/2015 | Witchey .................. G06Q 10/10 705/3 |
| 2015/0379510 A1 | 12/2015 | Smith |
| 2015/0379636 A1 | 12/2015 | Szabo et al. |
| 2016/0012424 A1 | 1/2016 | Simon et al. |
| 2016/0028552 A1* | 1/2016 | Spanos ................ H04L 9/3297 713/178 |
| 2016/0035054 A1 | 2/2016 | Branscomb et al. |
| 2016/0050203 A1 | 2/2016 | Hefetz |
| 2016/0092874 A1 | 3/2016 | O'Regan et al. |
| 2016/0125376 A1 | 5/2016 | Beatty et al. |
| 2016/0125414 A1 | 5/2016 | Desai et al. |
| 2016/0140562 A1 | 5/2016 | Birukov et al. |
| 2016/0191243 A1 | 6/2016 | Manning |
| 2016/0275461 A1 | 9/2016 | Sprague et al. |
| 2016/0292672 A1 | 10/2016 | Fay et al. |
| 2016/0321654 A1 | 11/2016 | Lesavich et al. |
| 2016/0323109 A1 | 11/2016 | McCoy et al. |
| 2016/0342978 A1 | 11/2016 | Davis et al. |
| 2016/0342989 A1 | 11/2016 | Davis |
| 2016/0342994 A1 | 11/2016 | Davis |
| 2016/0379211 A1 | 12/2016 | Hoyos et al. |
| 2017/0005804 A1 | 1/2017 | Zinder |
| 2017/0011460 A1 | 1/2017 | Molinari et al. |
| 2017/0041296 A1 | 2/2017 | Ford et al. |
| 2017/0046526 A1 | 2/2017 | Chan et al. |
| 2017/0046651 A1* | 2/2017 | Lin ........................ G06Q 10/08 |
| 2017/0046664 A1 | 2/2017 | Haldenby et al. |
| 2017/0046680 A1 | 2/2017 | Crites |
| 2017/0053249 A1 | 2/2017 | Tunnell et al. |
| 2017/0054611 A1 | 2/2017 | Tiell |
| 2017/0091397 A1 | 3/2017 | Shah |
| 2017/0103167 A1 | 4/2017 | Shah |
| 2017/0103461 A1 | 4/2017 | Acu?a-Rohter et al. |
| 2017/0116693 A1 | 4/2017 | Rae et al. |
| 2017/0132625 A1 | 5/2017 | Kennedy |
| 2017/0132626 A1 | 5/2017 | Kennedy |
| 2017/0132630 A1 | 5/2017 | Castinado et al. |
| 2017/0140375 A1 | 5/2017 | Kunstel |
| 2017/0140394 A1 | 5/2017 | Cao et al. |
| 2017/0163733 A1 | 6/2017 | Grefen et al. |
| 2017/0177855 A1 | 6/2017 | Costa et al. |
| 2017/0178131 A1 | 6/2017 | Fernandez et al. |
| 2017/0178237 A1 | 6/2017 | Wong |
| 2017/0180134 A1 | 6/2017 | King |
| 2017/0200137 A1 | 7/2017 | Vilmont |
| 2017/0213209 A1 | 7/2017 | Dillenberger |
| 2017/0214675 A1 | 7/2017 | Johnsrud et al. |
| 2017/0214698 A1 | 7/2017 | Hughes et al. |
| 2017/0220998 A1 | 8/2017 | Horn et al. |
| 2017/0221052 A1 | 8/2017 | Sheng et al. |
| 2017/0223005 A1 | 8/2017 | Birgisson et al. |
| 2017/0228447 A1 | 8/2017 | Catania et al. |
| 2017/0230378 A1 | 8/2017 | Bliss |
| 2017/0232300 A1 | 8/2017 | Tran et al. |
| 2017/0235955 A1 | 8/2017 | Barkan |
| 2017/0236407 A1 | 8/2017 | Rhoads et al. |
| 2017/0243020 A1 | 8/2017 | Dhondse et al. |
| 2017/0243208 A1 | 8/2017 | Kurian et al. |
| 2017/0243213 A1 | 8/2017 | Castinado et al. |
| 2017/0339125 A1 | 11/2017 | Barrett |

OTHER PUBLICATIONS

Andreas M. Antonopoulos, Mastering Bitcoin: Unlocking Digital Crypto-Currencies, Dec. 2014, O'Reilly Media, Inc., pp. 1-282 (Year: 2014).

Dr. Gideon Greenspan, MultiChain Private Blockchain—White Paper, Jul. 2015, pp. 1-17 (Year: 2015).

Andreas M. Antonopolous, Mastering Bitcoin, Dec. 2014, O'Reilly Media, Inc. (Year: 2014).

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Buterin, Vitalik, "On Public and Private Blockchains", Aug. 7, 2015, https://blog.ethereum.org/2015/08/07/on-public-and-private-blockchains/.

Joseph C. Guagliardo et al., "Blockchain: Preparing for Disruption Like It's the '90s"; Mar. 14, 2016, retrieved from http://www.law360.com/articles/77120CVprint?section=ip.

Lerner. "Mavepay, A New Lightweight Payment Scheme for Peer to Peer Currency Networks." Apr. 17, 2012 ((Apr. 17, 2012) Retrieved

(56) References Cited

OTHER PUBLICATIONS from https://pdfs.sematicscholar.org/1185/a26f014678b959876519065c2624458d75b8.pdf>. Entire Document.

Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015, 6 pages.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

PCT International Searching Authority; International Search Report and Written Opinion for PCT/IB16/01655 completed Mar. 12, 2017, 4 pages.

PCT International Searching Authority; International Search Report and Written Opinion for PCT/US2016/061402 dated Dec. 27, 2016.

PCT International Searching Authority; Written Opinion for PCT/IB16/01655 completed Mar. 11, 2017, 8 pages.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

Robert Mcmillian, "IBM Bets on Bitcoin Ledger"; Feb. 16, 2016, retrieved from http://www.wsj.com/articles/ibm-bets-on-bitcoin-ledger-1455598864.

Tasca. "Digital Currencies: Principles, Trends, Opprotunities, and Risks." Trends, Opprotunities, and Risks. Sep. 7, 2015 (Sep. 7, 2015); Retrieved from http://www.researchgate.net/profile/Paolo_Tasca/publication/290805276_Digital_Currencies_Principles_Trends_Opporunities_and_Risks/Links569bb91e) 8ae6169e562552.pdf, p. 1, 5, 10, 12, 14.

\* cited by examiner

SYSTEM FOR SECURE ROUTING OF DATA TO VARIOUS NETWORKS FROM A PROCESS DATA NETWORK

CLAIM OF PRIORITY

The present application for a patent claims priority to (1) Provisional Application No. 62/293,585 entitled "SYSTEM FOR SECURE ROUTING OF DATA TO VARIOUS NETWORKS FROM A PROCESS DATA NETWORK" filed Feb. 10, 2016, and assigned to the assignee hereof and hereby expressly incorporated by reference herein; and (2) Non-Provisional application Ser. No. 15/086,619, entitled "SYSTEM FOR SECURE ROUTING OF DATA TO VARIOUS NETWORKS FROM A PROCESS DATA NETWORK" filed Mar. 31, 2016, and assigned to the assignee hereof and hereby expressly incorporated by reference herein.

BACKGROUND

Distributed block chain networks can be an efficient and reliable mode of recording information, such as transaction information. However, the type of transaction information, the desired functionality of the block chain network, and the desired security levels associated with different types of transaction information make it difficult to maintain a normal distributed block chain network with uniform security and functionality features.

For these reasons and others, there is a need for providing an improved block chain network environment that permits the recording of data and information one or more distinct block chain networks, based on functionality and/or security requirements of the data.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a block chain distributed network for using a block chain distributed network arrangement for facilitating a tiered dedicated block chain configuration. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may be configured to establish a plurality of dedicated block chains comprising varied levels of security and/or functionality. Additionally, the system may be configured to receive transaction information associated with a transaction, then determine a transaction factor from the transaction information. Furthermore, the system may identify a dedicated block chain associated with the transaction factor from the plurality of dedicated block chains. Finally, in some embodiments, the system may generate a new block for a transaction node in the identified dedicated block chain.

In some embodiments of the system, the transaction factor is a dollar amount of the transaction, a transaction type associated with the transaction, a merchant type associated with the transaction, and/or a net worth of a merchant associated with the transaction.

Some embodiments of the system construct the plurality of dedicated block chains in a tiered configuration based on a range of transaction amounts associated with each of the plurality of dedicated block chains, wherein a dedicated block chain associated with a range of transaction amounts that are above a certain transaction amount comprise additional security features than a dedicated block chain associated with a range of transaction amounts that are below the certain transaction amount.

Additionally, in some embodiments of the system, the plurality of dedicated block chains are tiered based on two or more customer service levels, wherein a dedicated block chain associated with a higher customer service level comprises additional security features than a dedicated block chain associated with a standard customer service level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
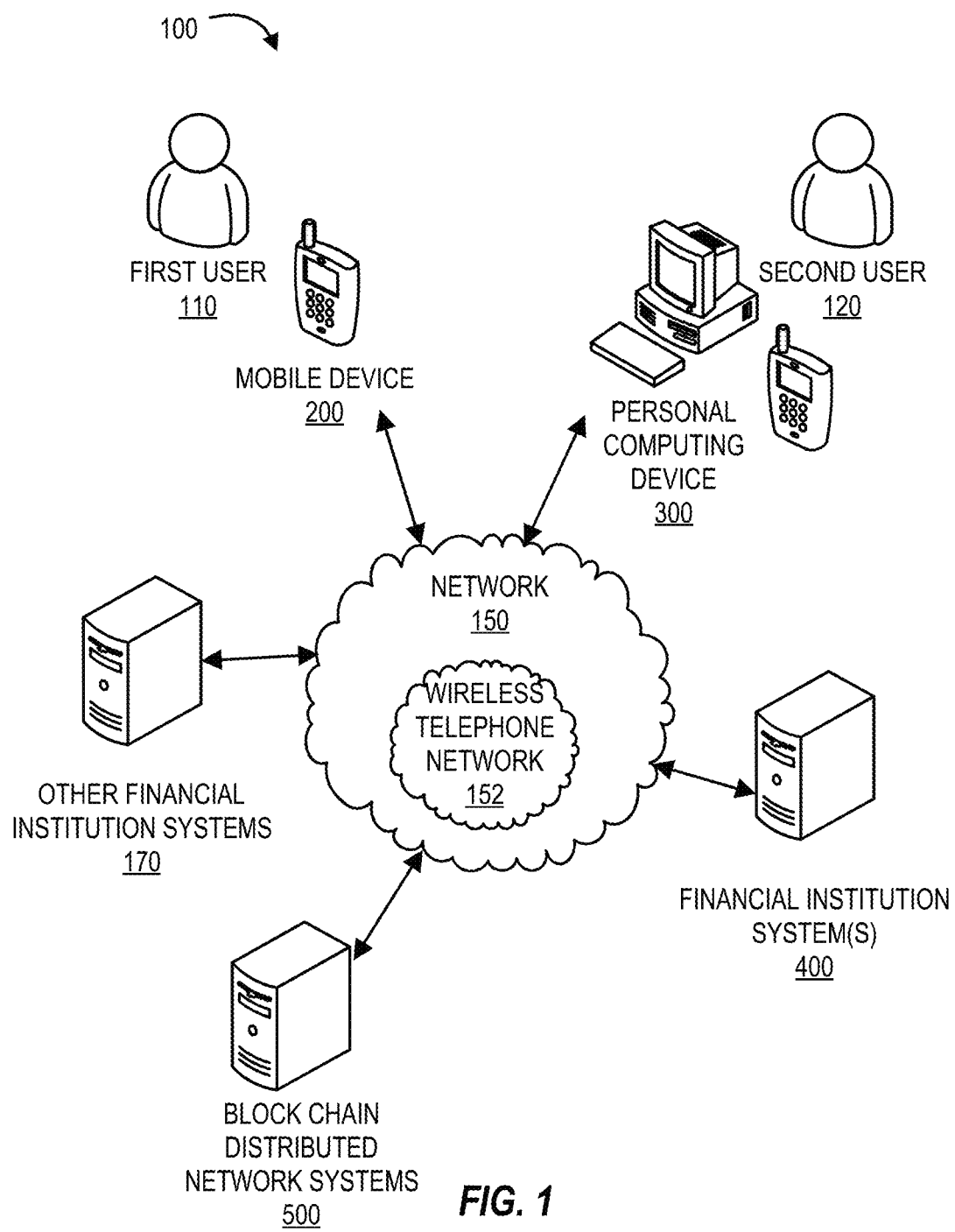
Figure 2:
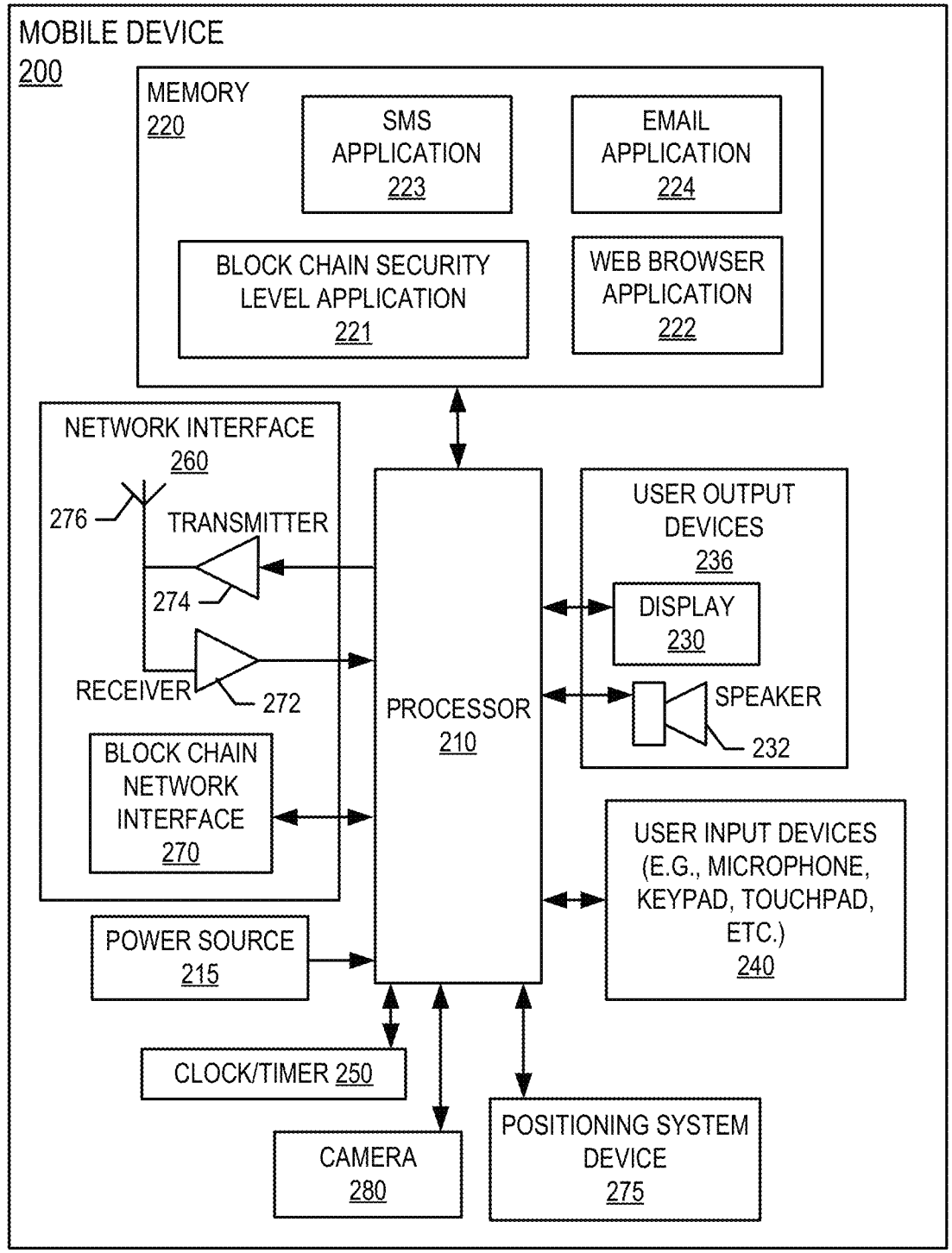
Figure 3:
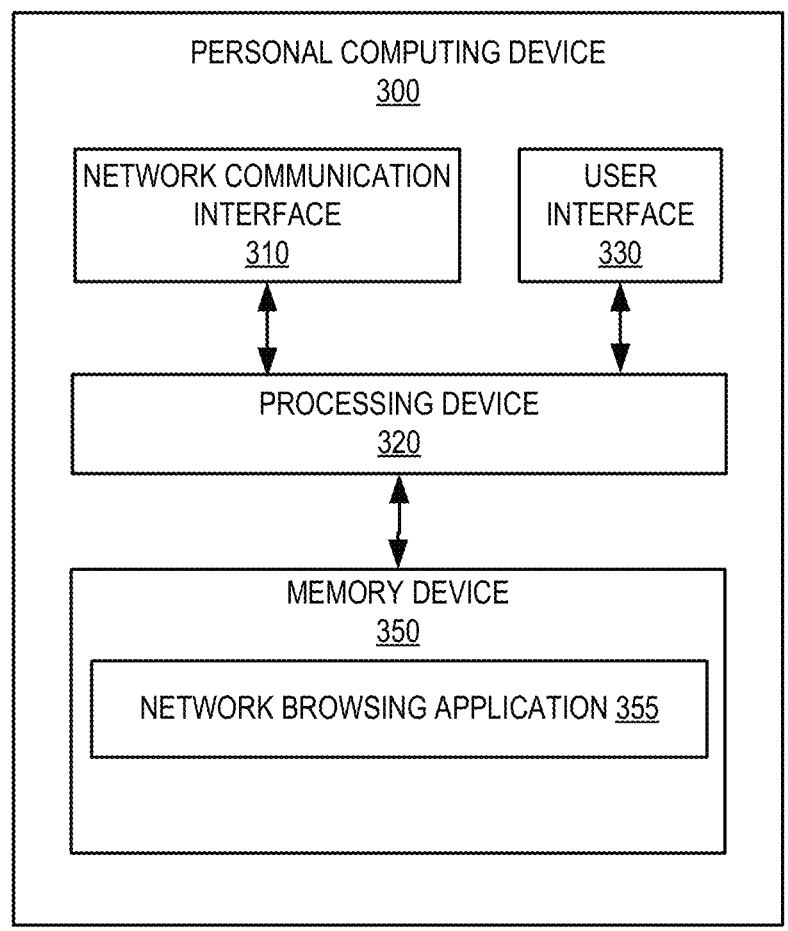
Figure 4:
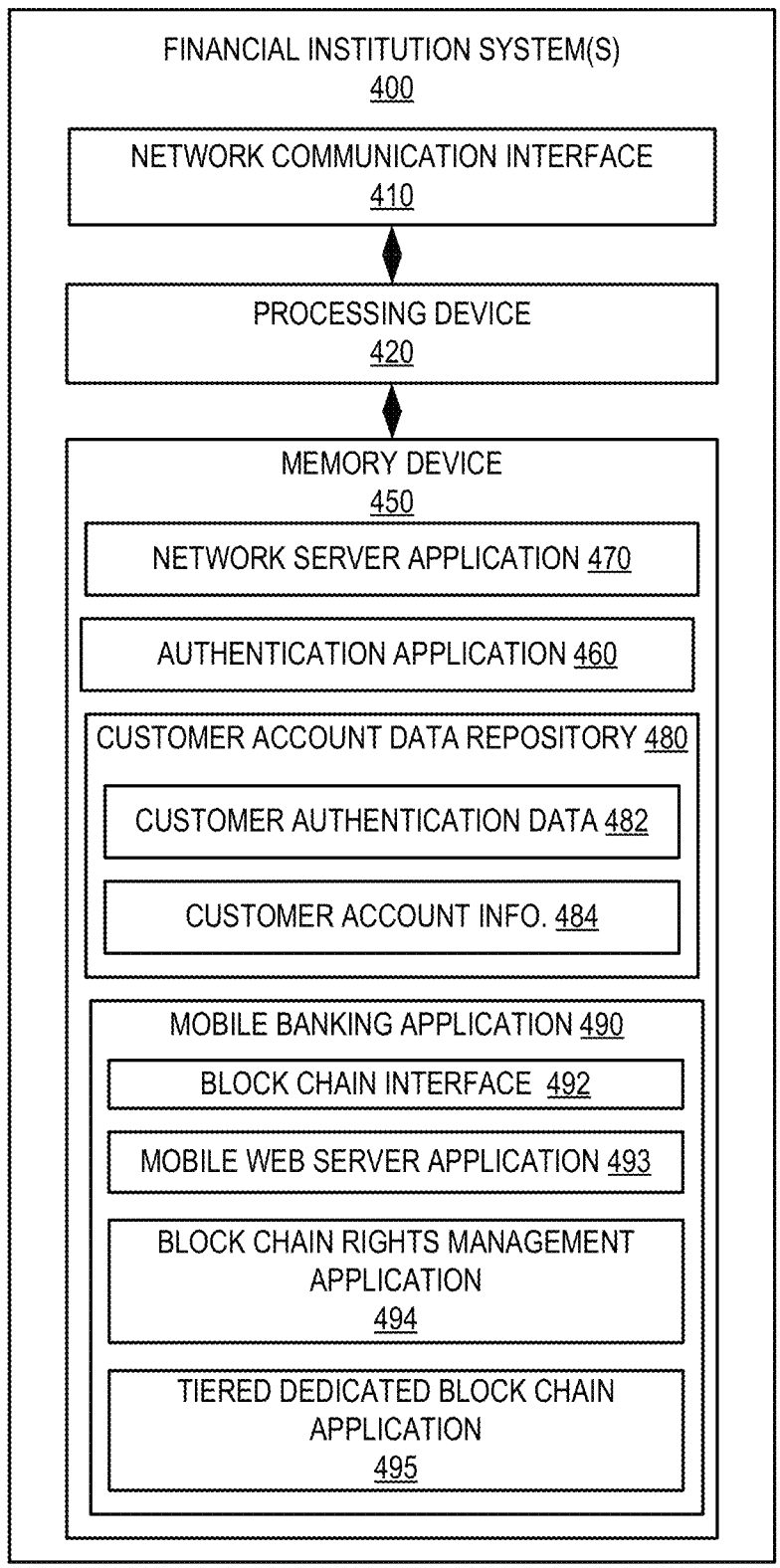
Figure 5:
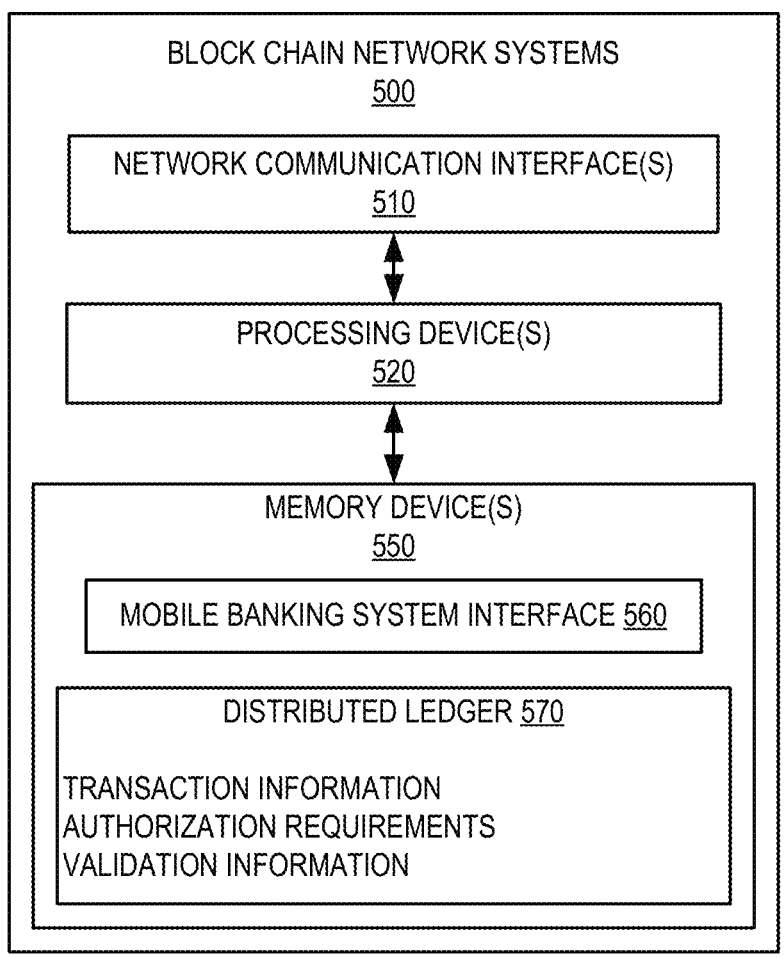
Figure 6A:
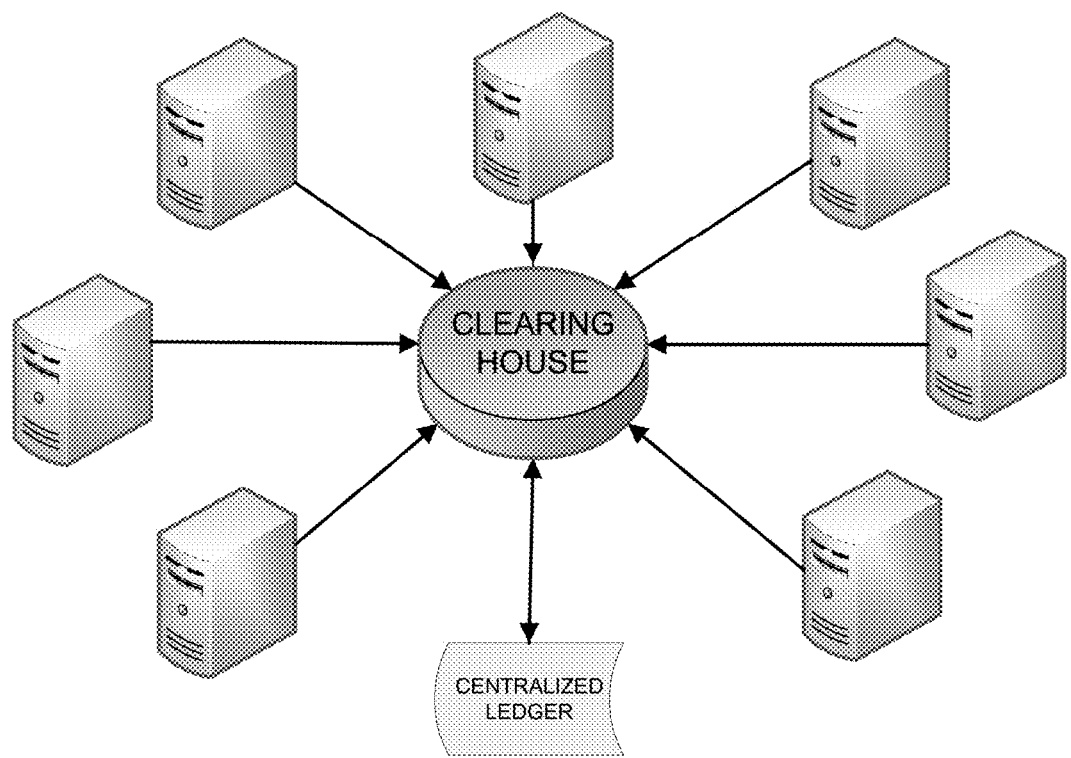
Figure 6B:
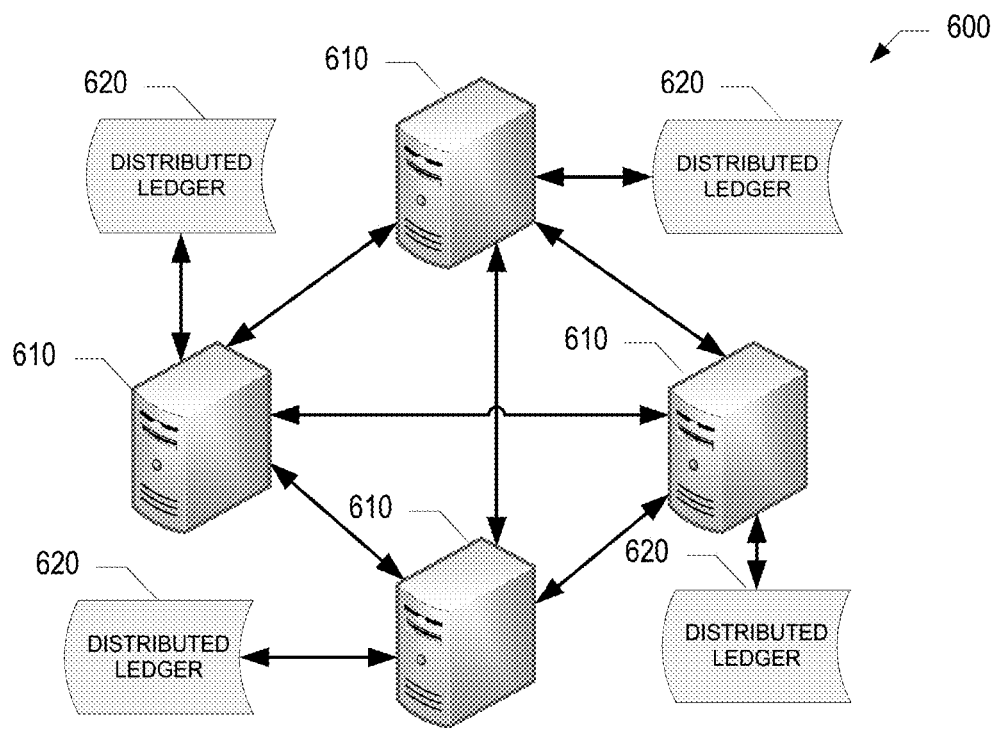
Figure 6C:
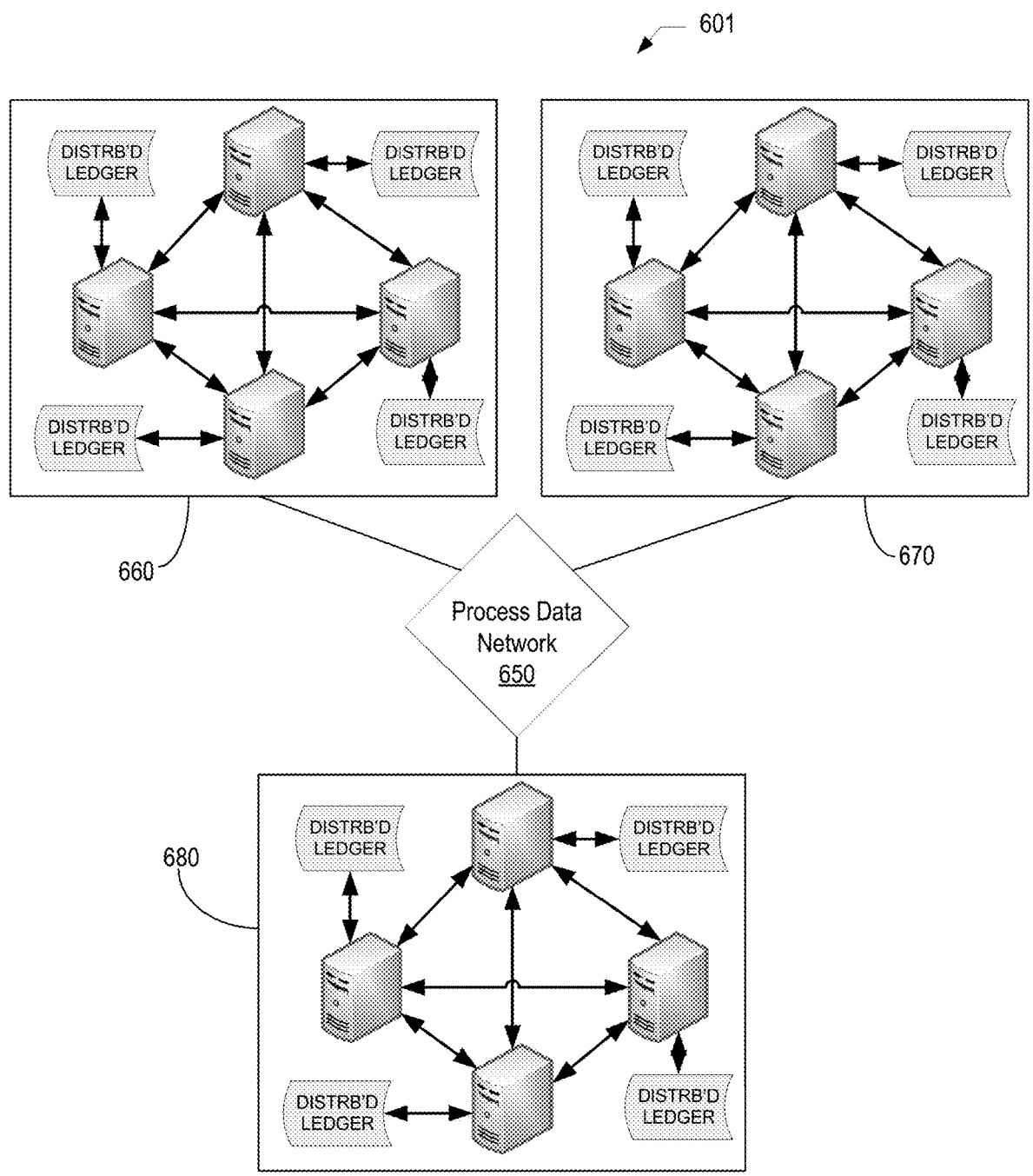
Figure 7:
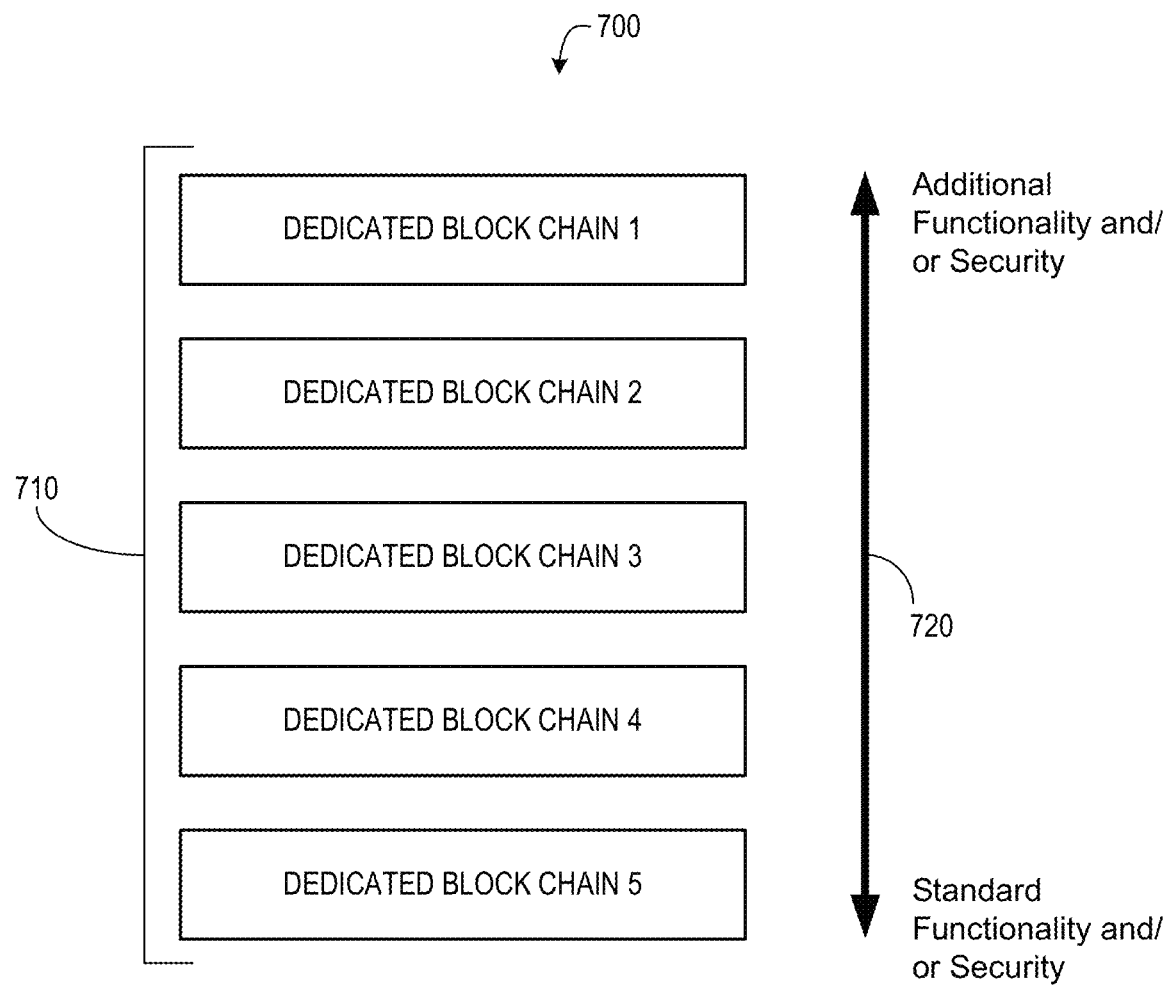
Figure 8:
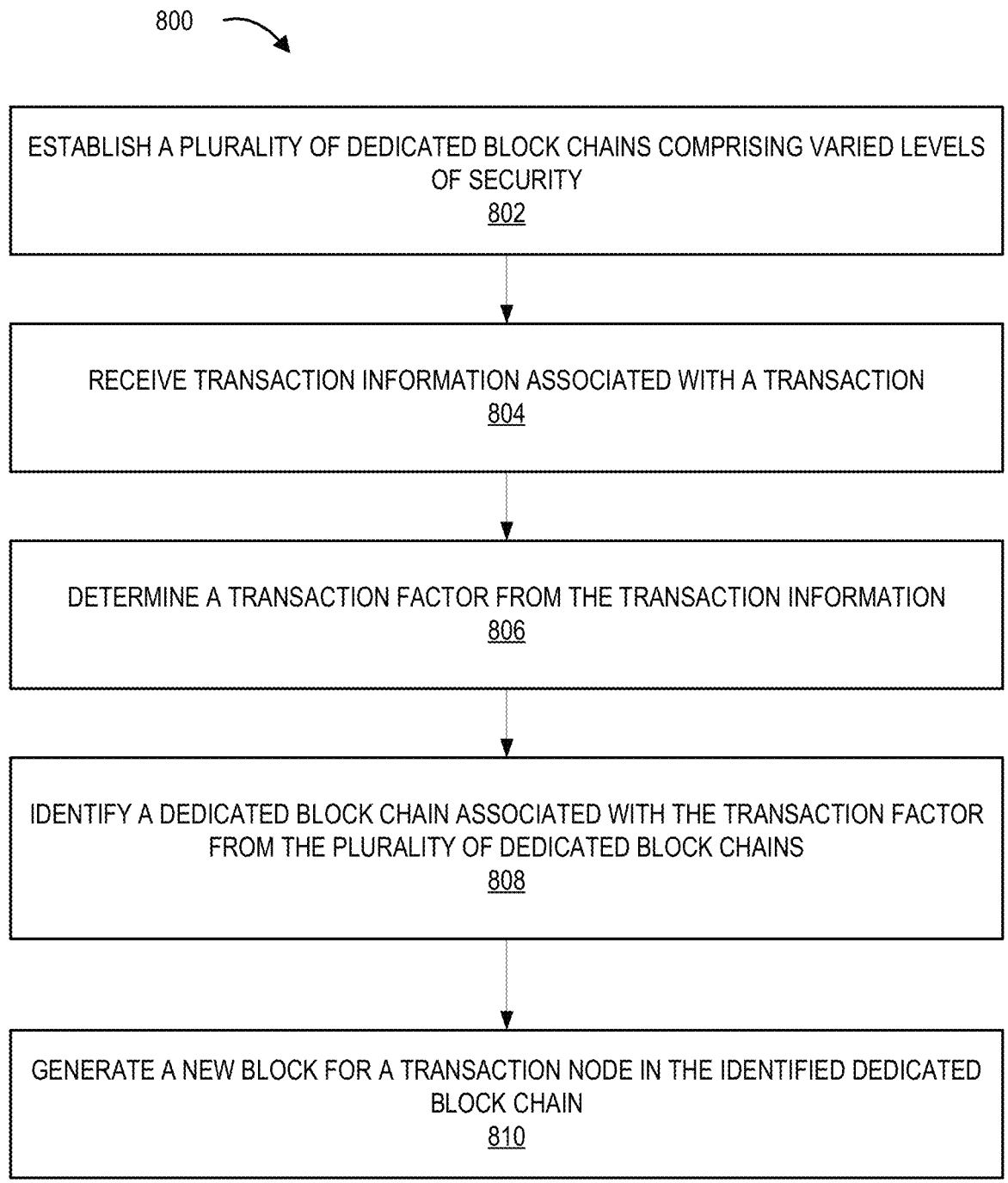
Figure 9:
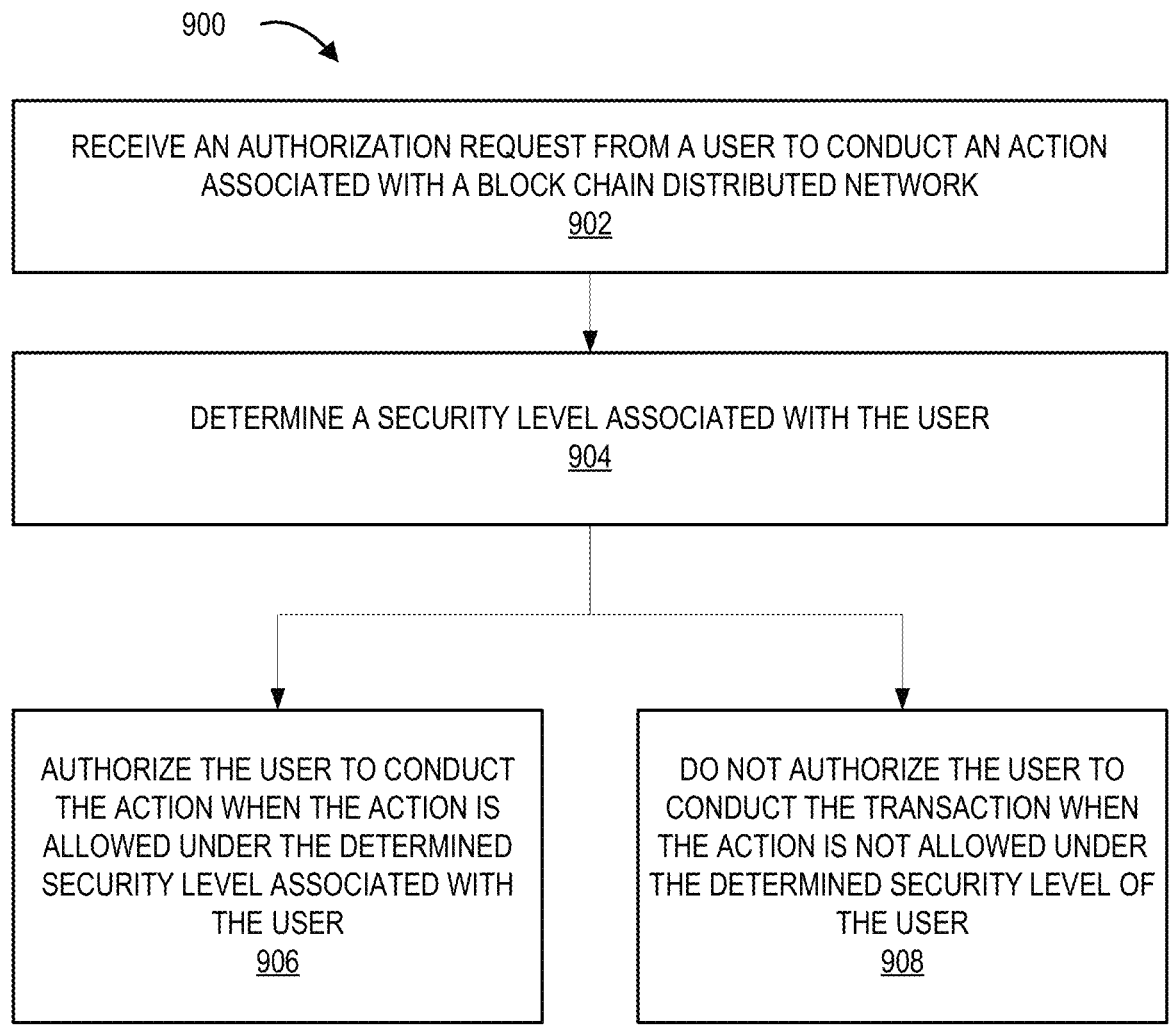

Having thus described embodiments of the invention in general terms, reference will now be made the accompanying drawings, wherein:

FIG. 1 provides a block diagram illustrating a block chain system and environment, in accordance with an embodiment of the invention;

FIG. 2 provides a block diagram illustrating the first user's mobile computing device of FIG. 1, in accordance with an embodiment of the invention;

FIG. 3 provides a block diagram illustrating the second user's personal computing device of FIG. 1, in accordance with an embodiment of the invention;

FIG. 4 provides a block diagram illustrating the financial institution's mobile banking system of FIG. 1, in accordance with an embodiment of the invention;

FIG. 5 provides a block diagram illustrating the block chain network systems of FIG. 1, in accordance with an embodiment of the invention;

FIG. 6A is a diagram illustrating a centralized clearinghouse network configuration, in accordance with embodiments of the invention;

FIG. 6B is a diagram illustrating a decentralized block chain network configuration, in accordance with embodiments of the invention;

FIG. 6C is a diagram illustrating an arrangement of dedicated decentralized block chain networks, in accordance with embodiments of the invention;

FIG. 7 is a diagram illustrating a tiered arrangement of the dedicated decentralized block chain networks of FIG. 6C, in accordance with embodiments of the invention;

FIG. 8 is a flowchart illustrating a method for providing multiple tiers of dedicated decentralized block chains to provide differing combinations of functions and security, in accordance with embodiments of the invention; and FIG. 9 is a flowchart illustrating a method for providing a rights management protocol within a decentralized block chain network for ensuring informational security, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for facilitating a rights management protocol to ensure information security within a block chain distributed network. Embodiments of the invention allow a financial institution to manage the access, generation, editing, retrieval, and validation rights of one or more users of the block chain distributed network, based on security levels of each user. The rights management protocol may grant certain rights and restrictions to specific individuals or groups of users, ensuring that the appropriate users are utilizing the block chain distributed network in their authorized manner. The security of the overall block chain distributed network can be altered by the rights management protocol, thereby changing at least a portion of the authorization rights for one or more of the users associated with the block chain distributed network. Such a system allows a financial institution to control the security and functionality levels of one or more private distributed block chain networks.

Some embodiments of the present invention provide a block chain distributed network arrangement for facilitating a tiered dedicated block chain configuration. Embodiments of the invention allow a financial institution or a group of financial institutions and/or third party systems to establish a plurality of separate, dedicated block chains comprising varied levels of security and/or functionality. Embodiments of the invention also allow a financial institution to receive transaction information at a process data network connected to the plurality of dedicated block chains and determine one or more transaction factors of the transaction data to determine which dedicated block chain should receive the transaction information. Transaction factors may include, but are not limited to, a dollar amount of the transaction, a transaction type, a merchant type, a net worth of the merchant, an affinity program associated with the customer and/or the merchant, an asset chain associated with the customer and/or the merchant, and the like. Once the transaction factor of the transaction data is matched with a dedicated block chain network, embodiments of the invention allow the financial institution to generate a new block at a transaction node of the matched dedicated block chain network. Such a system allows a financial institution, or a group of financial institutions, to maintain transaction data in reliable, validated databases with an appropriate level of security for each dedicated block chain. For example, the described system provides a way for the financial institution to maintain transaction data for a very large transaction in a similarly very secure dedicated block chain, and separate from smaller, day-to-day transactions that may not require the same security standards as the large transaction does.

FIG. 1 provides a block diagram illustrating a block chain system and environment 100, in accordance with an embodiment of the invention. As illustrated in FIG. 1, the environment 100 includes a first user 110 and/or a second user 120 where the users represent customers of one or more financial institution(s). A user of the system may be a person, but may also be a business (e.g., a merchant) or any other entity.

The environment 100 also may include a mobile device 200 and a personal computing device 300 for use by the first user 110 and second user 120, respectively. The personal computing device 300 may be any device that employs a processor and memory and can perform computing functions, such as a personal computer or a mobile device. As used herein, a "mobile device" 200 is any mobile communication device, such as a cellular telecommunications device (i.e., a cell phone or mobile phone), personal digital assistant (PDA), a mobile Internet accessing device, or other mobile device.

The mobile device 200 and the personal computing device 300 are configured to communicate over a network 150 with a financial institution system(s) 400 and, in some cases, one or more other financial institution systems 170 and with the block chain, as represented by the block chain distributed network systems 500. The first user's mobile device 200, the second user's personal computing device 300, the financial institution system(s) 400, the block chain distributed network systems 500, and any other participating financial institution systems 170 are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, a mobile device 200 is configured to connect with the network 150 to log the first user 110 into a block chain interface 492 of the financial institution system(s) 400 and/or the block chain distributed network systems 500 (i.e., "block chain systems 500). A user, in order to access the first user's account(s), online banking application and/or mobile banking application on the financial institution system(s) 400 must authenticate with the financial institution system(s) 400 and/or another system. Similarly, in some embodiments, in order to access the distributed ledger(s) of the block chain systems 500, a user must authenticate with the financial institution system(s) 400 and/or another system, such as one of the block chain systems 500. For example, logging into the financial institution system(s) 400 generally requires that the first user 110 authenticate his/her identity using a user name, a passcode, a cookie, a biometric identifier, a private key, a token, and/or another authentication mechanism that is provided by the first user 110 to the financial institution system(s) 400 via the mobile device 200.

The financial institution system(s) 400 are in network communication with other devices, such as other financial institutions' transaction/banking systems 170, block chain systems 500, and a personal computing device 300 that is configured to communicate with the network 150 to log a second user 120 into the financial institution system(s) 400. In one embodiment, the invention may provide an application download server such that software applications that support the financial institution system(s) 400 can be downloaded to the mobile device 200.

In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 400.

In some embodiments of the invention, the block chain systems 500 are configured to be controlled and managed by one or more third-party data providers (not shown), financial institutions or other entities over the network 150. In other embodiments, the block chain systems 500 are configured to be controlled and managed over the network 150 by the same entity that maintains the financial institution system(s) 400.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone is merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a block chain network interface 270. The block chain network interface 270 may include software, such as encryption software, and hardware, such as a modem, for communicating information to and/or from one or more devices on a network 150 and connected with or that are part of the block chain systems 500. For example, the mobile device 200 may be configured so that it can be used as an interface for interacting with the block chain for inputting information about one or more transactions. For example, the mobile device may 200 wirelessly communicate encrypted activity information to a terminal of the network 150 or the block chain systems 500.

As described above, the mobile device 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to receive data from a user such as the first user 110, may include any of a number of devices allowing the mobile device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a merchant or other location to determine that the mobile device 200 is located proximate these known devices.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a block chain security level application 221. These applications also typically provide a graphical user interface (GUI) on the display 230 that allows the first user 110 to communicate with the mobile device 200, the financial institution system(s) 400, and/or other devices or systems. In one embodiment of the invention, when the first user 110 decides to enroll in the block chain program, the first user 110 downloads, is assigned, or otherwise obtains the block chain security level application 221 from the financial institution system(s) 400, from the block chain systems 500 or from a distinct application server. In other embodiments of the invention, the first user 110 interacts with the financial institution system(s) 400 or the block chain systems 500 via the web browser application 222 in addition to, or instead of, the block chain security level application 221.

The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, and the like.

Referring now to FIG. 3, the personal computing device 300 associated with the second user 120 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system(s) 400 and/or the block chain systems 500 (shown in FIG. 1) for the purpose of providing a rights management protocol for a block chain arrangement, providing a tiered dedicated block chain system, and the like, in accordance with embodiments of the invention.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 110 or second user 120 or output data to the first user 110 or second user 120. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the financial institution system(s) 400, in greater detail, in accordance with embodiments of the invention. As illustrated in FIG. 4, in one embodiment of the invention, the financial institution system(s) 400 include one or more processing devices 420 operatively coupled to a network communication interface 410 and a memory device 450. In certain embodiments, the financial institution system(s) 400 are operated by a first entity, such as a financial institution, while in other embodiments, the financial institution system(s) 400 are operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system(s) 400 described herein. For example, in one embodiment of the financial institution system(s) 400, the memory device 450 includes, but is not limited to, a network server application 470, an authentication application 460, a customer account data repository 480 which includes customer authentication data 480 and customer account information 484, a mobile banking application 490 which includes a block chain interface 492, a mobile web server application 493, a block chain rights management application 494, a tiered dedicated block chain application 495, and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the block chain interface 492 when authenticating a user to the financial institution system(s) 400 and/or the block chain systems 500.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 450, such as the mobile device 200, the personal computing device 300, the other financial institution banking systems 170, and the block chain systems 500. The processing device 420 is configured to use the network communication interface 410 to transmit and/or receive data and/or commands to and/or from the other devices connected to the network 150.

FIG. 5 provides a block diagram illustrating block chain network systems 500, in accordance with embodiments of the invention. As discussed with reference to FIG. 6B below, embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network systems 500 are operated by a second entity that is a different or separate entity from the first entity (e.g., the financial institution) that, in one embodiment of the invention, implements the financial institution system(s) 400. In some embodiments, the financial institution system(s) 400 are part of the block chain. Similarly, in some embodiments, the block chain network systems 500 are part of the financial institution system(s) 400. In other embodiments, the financial institution system(s) 400 are distinct from the block chain network systems 500.

As illustrated in FIG. 5, the one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network systems 500, the memory device 550 stores, but is not limited to, a mobile banking system interface 560 and a distributed ledger 570. In some embodiments, the distributed ledger 570 stores data including, but not limited to, transaction information (e.g., price information, transacting parties, time and date of transaction, products associated with the transaction, interested parties to the transaction, description of the goods or services of the transaction, and the like), authorization requirements for interacting with the transaction data, block chain network rules or requirements, block miner information, validation information, authentication information, and the like. In one embodiment of the invention, both the mobile banking system interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to a mobile device 200, a personal computing device 300, other financial institution systems 170, other block chain network systems 500, the financial institution system(s) 400 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the block chain network systems 500. For example, in one embodiment of the invention, although the financial institution system(s) 400 are operated by a first entity (e.g., a financial institution), a second entity operates one or more of the block chain network systems 500 that store various copies of the distributed ledger 570.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

As discussed above, in some embodiments of the invention, an application server or application download server (not shown) might be provided. The application download server may include a network communication interface, a processing device, and a memory device. The network communication interface and processing device are similar to the previously described network communication interface 410 and the processing device 420 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified user's mobile device or personal computing device.

Block Chain Configuration/Architecture

Rather than utilizing a centralized database of transaction information as discussed with reference to some embodiments above and as shown in FIG. 6A, other various embodiments of the invention may use a decentralized block chain configuration or architecture as shown in FIG. 6B in order to facilitate a rights management protocol in a block chain distributed network or a tiered dedicated block chains network. Such a decentralized block chain configuration ensures accurate mapping transaction data to financial institutions, merchants, third parties, and/or customers. Accordingly, a block chain configuration may be used to maintain an accurate ledger of transaction data, security levels of entities associated with the block chain configuration and to provide validation of transaction data and security levels involving the entities associated with the block chain network.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, (e.g., when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, meets other criteria. In some block chain systems, miners are incentivized to create blocks by a rewards structure that offers a pre-defined per-block reward and/or payments offered within the transactions validated themselves. Thus, when a miner successfully validates a transaction on the block chain, the miner may receive rewards and/or payments as an incentive to continue creating new blocks.

As mentioned above and referring to FIG. 6B, a block chain 600 is typically decentralized—meaning that a distributed ledger 620 (i.e., a decentralized ledger) is maintained on multiple nodes 610 of the block chain 600. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

Various other specific-purpose implementations of block chains have been developed. These include distributed domain name management, decentralized crowd-funding, synchronous/asynchronous communication, decentralized real-time ride sharing and even a general purpose deployment of decentralized applications.

Referring now to FIG. 6C, multiple dedicated (i.e., distinct) block chain networks 660, 670, and 680 similar to the block chain 600 of FIG. 6B are provided in an arrangement 601 with a process data network 650, in accordance with embodiments of the invention. Each dedicated block chain network 660, 670, and 680, is completely separated from the others, and may each be configured to provide varying levels of functionality and security. As such, transaction information received or identified by the process data network 650 may be directed to one or more of the dedicated block chain networks 660, 670, and 680 based on their respective functionality and security protocols. For example, the dedicated block chain network 660 may have a security protocol with the most additional security components or features of the arrangement 601, and therefore may receive the most security-sensitive transaction data from the process data network 650. Additionally, the dedicated block chain network 670 may have the fastest processing and validation time of the arrangement 601, and therefore may receive the most time-sensitive transaction data from the process data network 650.

Each dedicated block chain network 660, 670, and 680 may have its own set of allowed users (e.g., users or entities that operate one or more nodes), allowed transaction types, allowed transaction amounts, allowed security measures, allowed validation measures, and the like. The dedicated block chain networks 660, 670, and 680 may comprise a different numbers of nodes; may have different numbers of associated users or entities; may be private, public, or a combination of private and public networks; and the like. In this way, the dedicated block chain networks 660, 670, and 680 can maintain separated, specialized block chains within a larger arrangement 601.

FIG. 7 illustrates a tiered arrangement 700 of the dedicated block chains, like the dedicated decentralized block chain networks 660, 670, and 680 of FIG. 6C, in accordance with embodiments of the invention. The dedicated block chains 710 may be configured in a tiered format based on a ranking scale 720 that lists the dedicated block chains 710 in descending order from block chains with additional functionality and/or security to block chains with standard functionality and/or security. As shown in FIG. 7, Dedicated Block Chain 1 is currently ranked highest in the tiered arrangement 700, due to the fact that it has more additional functionality features and/or more additional security features than Dedicated Block Chains 2-5.

Routing Data to a Tiered Dedicated Block Chain Network Arrangement

Turning now to FIG. 8, a flowchart is provided to illustrate a process 800 for providing multiple tiers of dedicated decentralized block chains to provide differing combinations of functions and security, in accordance with embodiments of the invention. The process 800 may begin as shown in block 802 by the system establishing a plurality of dedicated block chains comprising varied levels of security. In some embodiments, the plurality of dedicated block chains may be in the form of the dedicated decentralized block chain networks 660, 670, and 680, as discussed with regard to FIG. 6C. Each dedicated block chain may have its own set of rules and requirements that may be different from the other dedicated block chains. In this manner, the system may organize multiple dedicated block chains that do not interact directly with each other, into a tiered or otherwise organized arrangement for transaction information processing.

Additionally, the plurality of dedicated block chains may be configured in a similar manner to the dedicated block chains 710 of FIG. 7, where each dedicated block chain is ranked against the other dedicated block chains based on the functionality and/or the level of security associated with the dedicated block chain. In some embodiments, the dedicated block chains may be grouped or ranked based on other factors, such as the number of nodes in each dedicated block chain, the length of time each dedicated block chain has been active, the number of entities currently associated (e.g., authorized to read and write blocks, and the like) with each dedicated block chain, and the like.

The dedicated block chains may also be tiered based on transaction amounts. For example, each dedicated block chain may be associated with a particular range of transaction amounts, where a financial institution enters all relevant information associated with a transaction into a new block in the specific dedicated block chain that contains transactions of a similar amount. In such embodiments, the dedicated block chains that contain ranges of higher transaction amounts may be configured with more stringent access and security requirements than dedicated block chains that contain ranges of lower transaction amounts.

In some embodiments, the plurality of dedicated block chains are tiered based on customer service levels associated with each dedicated block chain. For example, a dedicated block chain associated with a high customer service level will have more additional functionality features and/or additional security features than a dedicated block chain associated with a lower, or standard customer service level. Therefore, transaction information associated with customers of a financial institution that have the highest customer service level may be sent by the system to the dedicated block chain with the most functionality and/or security. Likewise, transaction information associated with a customer that has a mid-level customer service level may be sent by the system to a different dedicated block chain with some additional security features, or a different amount of functionality.

In some embodiments, the dedicated block chains are separated based on the functionality of each dedicated block chain, or based on the type of transaction information associated with each dedicated block chain. For example, a distinct, dedicated block chain may be generated for an affinity relationship between one or more merchants and their customers. As such, a financial institution may set up a dedicated block chain for a rewards program or other affinity program for a first merchant, populating the blocks and/or the ledgers of the dedicated block chain with customer information for every customer that has signed up for the affinity program. As new customers enter the program, the system may add a block to one or more nodes in the block chain that can be validated to confirm the authenticity of the registration and to store one or more portions of the customer's information in an associated ledger.

In some embodiments, multiple merchants with similar affinity programs (or affinity programs that utilize similar customer information data) may be included in the same dedicated block chain network. As such, the customer information may also include which merchant affinity programs the customer has agreed to join, and which customer information is available to which merchant. The multiple merchants may have different rights or restrictions regarding the data stored in the dedicated block chain, based on the merchant's level of involvement, the merchant's customer service level held with the financial institution, and the like.

The financial institution may organize a plurality of these affinity program based dedicated block chain networks, with each dedicated block chain network comprising information pertaining to specific merchants, specific merchant types, and/or types and amounts of customer data held in each dedicated block chain. Therefore, different affinity programs may have their own, distinct dedicated block chain network, but the financial institution may be able to write in certain customer information into multiple dedicated block chain networks, based on the rights and requirements of each dedicated block chain network.

The dedicated block chain networks may also be organized based on individual, or groups of customers of the financial institution. For example, a financial institution may establish a dedicated asset block chain to hold business asset information for one or more businesses. Each associated business may either actively provide asset information (e.g., equipment purchased, real estate owned, stock information, cash reserve information, and the like) to the financial institution, or the financial institution may record the asset information as part of a transaction process with a business (e.g., the financial institution finances the purchase of a tractor for a business and therefore records the asset along with the terms of the finance agreement in an associated dedicated block chain network). In this manner, a business customer of the financial institution, and the financial institution can keep secure, reliable, and time-stamped records of the assets of the business.

Similarly, the financial institution may establish dedicated block chains that are organized based on individual or groups of non-business customers to track and maintain records of identity information for each customer, asset chain information of each customer, and other personal and financial information of the customer. Such an embodiment may allow the financial institution to easily and securely access a customer's pertinent information when determining whether the customer is eligible or authorized to receive an offer for a product or service of the financial institution or for a business customer of the financial institution.

The security features of decentralized block chain networks reside in the legitimacy of node miners, the node validation requirements, the user identity requirements, and the like. The legitimacy of miners, that generate and maintain nodes for storing blocks and ledgers, can be improved by provide greater incentives for creating and maintaining the nodes. The miners can be incentivized by offering pre-defined "per-block" rewards, where the miner is paid a reward for every block properly generated and/or maintained. Additionally, miners can be incentivized by offering a payment or reward per transaction that either goes through one of the miner's nodes, or is authorized within the entire block chain network. Furthermore, identity checks, background checks, and the like can be performed to confirm the legitimacy of miners in the block chain network. Users, whether they be individual customers or other financial institutions, can be validated in person or through unique signatures to ensure that the entity bringing a transaction into the block chain network, or the entity validating a transaction, is in fact the expected entity. Node validation requirements such as the number and/or percentage of validations for each transaction are directly proportional to the security of the system.

In some embodiments, the process 800 may include block 804, where the system receives transaction information associated with a transaction. The transaction information may be received from a merchant system, from an electronic device of the user, from a third-party system (e.g., a clearing house), and the like. The system may receive the transaction information at a process data network like the process data network 650 discussed in relation to FIG. 6C. The process data network may have at least partial read and write privileges to each of the plurality of dedicated block chains, and the process data network may be associated with at least one node in each of the dedicated block chains.

The transaction information may be any financial information of a customer of the financial institution, including a product price, a product type, a time and date of purchase, a merchant associated with the purchase, a geographic location of the purchase, payment vehicle information associated with the purchase, a customer service level associated with the customer, a customer service level associated with the merchant, and the like. The customer of the financial institution may be an individual, an organization, a business, another financial institution, and the like.

Furthermore, in some embodiments, the process 800 includes block 806, where the system determines a transaction factor from the transaction information. Transaction factors are factors of the transaction that will help the system determine which of the dedicated block chain networks to send at least a portion of the financial information. Transaction factors include, but are not limited to, a dollar amount of the transaction, a transaction type, a merchant type, a net worth of the merchant, an affinity program associated with the customer and/or the merchant, an asset chain associated with the customer and/or the merchant, and the like. The transaction factor may be determined from a receipt of the transaction (electronic or otherwise), from customer input, from merchant input, from third party input, and the like.

In some embodiments, the process 800 may include block 808, where the system identifies a dedicated block chain associated with the transaction factor from the plurality of dedicated block chains. As described above, the dedicated block chains may be tiered or otherwise organized such that each dedicated block chain is configured to receive, log, and store a certain type of transaction information. Additionally, each individual dedicated block chain may comprise unique or specialized organizational structures, access protocols, retrieval protocols, and validation protocols, based on the desired security and/or functionality level of the dedicated block chain. Therefore, each dedicated block chain is specialized to receive transaction information comprising a specific transaction factor, or a specific grouping of transaction factors.

As such, the system may match the identified financial transaction factors to their respective dedicated block chain network. Additionally, the system may also prohibit at least a portion of the transaction information from being matched with, or associated with, one or more other dedicated block chain networks.

Finally, in some embodiments, the process 800 may include block 810, where the system generates a new block for the transaction at a node in the identified dedicated block chain. Once the system has matched the transaction factor(s) to an appropriate dedicated block chain, the system may log the transaction information at one or more nodes of that appropriate dedicated block chain by generating or originating a new block in the block chain. The logging process also includes a time stamp step to help the dedicated block chain maintain a sequencing of the recorded transactions over time.

In some embodiments, the system may also write one or more portions of the transaction information into the ledger, including notes and other information that is not commonly or easily recorded in a block.

Providing a Rights Management Protocol to Ensure Information Security

Referring now to FIG. 9, a flowchart is provided to illustrate a process 900 for providing a rights management protocol within a decentralized block chain network to ensure informational security, in accordance with embodiments of the invention. The process 900 may begin with block 902, where the system receives an authorization request from a user to conduct an action associated with a block chain distributed network. The requested action may be any action associated with the creation, editing, maintenance, and review of a block chain network. Examples of actions that the user may conduct include, but are not limited to, writing data to a block, reading data from a block and/or a ledger, validating a node, challenging a validation of a block, editing a block or ledger, inviting a new entity to join the block chain, removing an entity from a block chain, and the like. When the user attempts to conduct the action, the system may receive the attempt as a request from the user to be authorized to carry out the action.

Each user may be associated with a certain security level, as designated by the financial institution, or a group of financial institutions that are associated with the same decentralized block chain network. The security level may be associated with a customer service level of the user, a trustworthiness of the customer, the business and/or personal needs of the customer, and the like. The security level of a customer is directly associated with the rights and restrictions of the user in accessing and manipulating information from the block chain network. Therefore, in some embodiments, the process 900 includes block 904, where the system determines a security level associated with the user.

In some embodiments, each node of a block chain network is associated with one or more entities, where each entity is confirmed by the other entities of the block chain network. As such, when a first entity wishes to access or otherwise interact with data on a block chain at a node of a second entity, the second entity can authorize access to its data based on who the first entity is, and based on how trustworthy the second entity believes the first entity to be. For example, if the first entity is a large, well-known entity with a close business relationship with the second entity, then the second entity may provide a standard security level for the first entity's interaction with its data on the node. However, if a third entity wishes to interact with the second entity's data, and the third entity is a smaller business and does not have a close business relationship with the second entity, then the second entity can provide a strict security level with additional security features to the third entity. In this manner, each entity of the same block chain network can set their own security levels, requirements, and parameters based on that entity's security and/or business policies. As each entity maintains their own security measures, their data is not affected by any security policies held by other entities.

The security level of each user, or entity, may be based on the node from which a user or entity submits a request for data. The entity or user associated with the requested node(s) can identify the requesting node and, based on this identification, determine which security level to associate with the requesting user or entity. In this manner, the security roles can be stored on the block chains themselves, where the identities, security levels, and any additional associated parameters can be securely stored and managed.

Some embodiments of the invention include private, or hybrid block chain networks where multiple financial entities and related entities are all parties to a block chain network, where each entity is associated with one or more nodes of the block chain network. Based on the security practices of the associated parties, the collective group may not need to require the maintenance of certificates for the use of block chain nodes, as the parties will be known and not expected to change. Because the security levels may still be stored within the block chain network and/or simply associated with the requesting node, entities of the block chain network can maintain a block chain network with unique security levels for multiple entities of the block chain network.

In some embodiments, the security level of the user may be identified by matching the user to account and/or user information stored in a database with the financial institution or a third party. Additionally, the system may prompt the user to provide one or more pieces of identification and/or business information to assess the user's proper security level. Examples of possible security levels include, but are not limited to full read and write privileges, the right to block validation at one or more nodes, the right to retrieve at least a portion of the data in the block chain network, and the like.

Some users may have specialized security levels, where the user is only authorized to perform a specific function. For example, a single user may be authorized to validate nodes within the block chain network, but that user may not be authorized to generate a new block within the same block chain network.

In some embodiments, a single user may have different security levels for different types of information. For example, the user may have a right of access and retrieval to transaction price information in the block chain network, but the user may only have a right of access to the rest of the transaction information (e.g., parties involved, time and date of the transaction, validators of the transaction, and the like).

A rights management protocol of the system may be utilized to take one or more actions in response to the received authorization request and the user's determined security level. The rights management protocol may determine whether the user is authorized to conduct the desired action based on the security level, and can adjust or change the security level of the user based on additional input.

Therefore, the process 900 may include block 906, where the system authorizes the user to conduct the action when the action is allowed under the determined security level associated with the user. By authorizing the user, the system allows the user to conduct only the authorized action(s) within the block chain network. For example, when a user is authorized to generate a new block at a node, the system allows the user to generate the new block at one or more of the nodes in the block chain network, extending the block chain for that node.

In some cases, the user is authorized to conduct an action on only a portion of the data and/or nodes within the block chain distributed network. In such embodiments, the system may screen the user from information, nodes, tasks, other users, and the like, when the user is not authorized to interact with these things. In this manner, the user may be granted limited access to the block chain distributed network.

In some embodiments, the system may place time and/or frequency limitations on the user's access to the block chain network. For example, the system, based on the security level of the user, may determine that the user is only allowed to access the block chain network for the purpose of conducting the desired action for a certain predetermined period of time (e.g., 10 minutes, 30 minutes, 2 hours, 1 week, and the like). Once the predetermined time is up, the system may kick the user out of the block chain network or otherwise restrict the user's access to the block chain network until the user is re-authorized to conduct the action.

Similarly, the system may determine, based on the security level of the user, that the user is only allowed to access the block chain network to conduct the action a certain number of times within a predetermined period of time (e.g., twice in 30 minutes, 60 times in 1 week, and the like). In such embodiments, the system will kick the user out of the block chain network as soon as the user hits either the allotted number of actions or once the allotted predetermined period of time has passed.

Alternatively, the process 900 may include block 908, where the system does not authorize the user to conduct the action when the action is not allowed under the determined security level of the user. The system is therefore able to maintain a desired level of security for the block chain network by appropriately managing the rights of certain users in accessing the block chain network.

However, in some scenarios, the security level associated with the user may include a provision that the user may be authorized to view certain data by providing additional authorization credentials and/or by paying an access payment. For example, the system may prompt the user to provide additional authorization credentials based on the determined security level associated with the user. In some embodiments, the system prompts an electronic device, such as a user's mobile device, to present the request for additional authentication credentials on a user interface of the electronic device. The user may then send the authorization credentials to the system, where the system can validate the authentication credentials. In some embodiments, the user may enter the additional authentication credentials into the electronic device, which may transmit the authentication credentials to a computing device of the system. Once further authorized, the user may be granted access to the block chain network to conduct the desired action.

Similarly, the system may prompt the user to provide an access payment to view or extract certain information from the block chain network (e.g., pull data from a ledger). Once the system receives the access payment from the user, the system will then authorize the user to conduct the desired action.

In some embodiments, the rights management protocol of the system may alter either the security levels of one or more users or the authorizations associated with each security levels of the users. For example, the rights management protocol may determine that additional validators are needed in the system to maintain a timely and efficient validation of new blocks at block chain nodes. Therefore, the system may provide at least temporary validation rights to one or more users that previously did not have validation rights as part of their security level clearance.

Additionally, the rights management protocol of the system may determine that the block chain network may be compromised, and therefore the rights management protocol may reduce or remove authorizations for one or more users on at least a temporary basis until the rights management protocol determines that the block chain network is no longer compromised. In a similar embodiment, the rights management protocol of the system may alternate the rights of each user, or groups of users, and monitor the actions of each user to determine one or more users that may be associated with the compromised block chain network. For example, if the system determines that one or more users are adding improper transaction information into blocks, the system may cycle through groups of users that normally have writing authorization, turning off each group's writing authorization for a period of time. The system may then analyze the occurrence and/or frequency of potentially improper transactions during the each cycled time period to determine that the improper transactions occurred less (or not at all) when the writing authorizations for one or more users was turned off. The system may then look into this group of individuals and possibly request additional authentication credentials before renewing their authorizations to write new blocks into the system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. patent application Ser. No. | Title | Filed On |
|---|---|---|---|
| 6823US1.014033.2555 | 14/942,326 now U.S. Patent Publication No. 2017/0140408 | TRANSPARENT SELF-MANAGING REWARDS PROGRAM USING BLOCKCHAIN AND SMART CONTRACTS | Nov. 16, 2015 |
| 6908US1.014033.2652 | 15/041,555 now U.S. Patent Publication No. 2017/0132630 | BLOCK CHAIN ALIAS FOR PERSON-TO-PERSON PAYMENTS | Feb. 11, 2016 |
| 6908USP1.014033.2556 | 62/253,935 | BLOCK CHAIN ALIAS PERSON-TO-PERSON PAYMENT | Nov. 11, 2015 |
| 6985US1.014033.2605 | 15/041,566 now U.S. Patent Publication No. 2017/0132615 | BLOCK CHAIN ALIAS PERSON-TO-PERSON PAYMENTS | Feb. 11, 2016 |
| 6988US1.014033.2607 | 15/050,375 now U.S. Pat. No. 10,135,870 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 6989US1.014033.2608 | 15/050,379 now U.S. Patent Publication No. 2017/0243215 | SYSTEM FOR EXTERNAL SECURE ACCESS TO PROCESS DATA NETWORK | Feb. 22, 2016 |
| 6990US1.014033.2609 | 15/050,358 now U.S. Pat. No. 10,178,105 | SYSTEM FOR PROVIDING LEVELS OF SECURITY ACCESS TO A PROCESS DATA NETWORK | Feb. 22, 2016 |
| 6992USP1.014033.2611 | 62/293,620 | SYSTEM FOR CENTRALIZED CONTROL OF SECURE ACCESS TO PROCESS DATA NETWORK | Feb. 10, 2016 |
| 6993US1.014033.2612 | 15/049,605 now U.S. Pat. No. 10,129,238 | SYSTEM FOR CONTROL OF SECURE ACCESS AND COMMUNICATION WITH DIFFERENT PROCESS DATA NETWORKS WITH SEPARATE SECURITY FEATURES | Feb. 22, 2016 |

-continued

| Docket Number | U.S. patent application Ser. No. | Title | Filed On |
| --- | --- | --- | --- |
| 6994US1.014033.2613 | 15/049,716 now U.S. Patent Publication No. 2017/0243208 | SYSTEM FOR CONTROL OF DEVICE IDENTITY AND USAGE IN A PROCESS DATA NETWORK | Feb. 22, 2016 |
| 6996US1.014033.2615 | 15/049,777 now U.S. Pat. No. 10,142,312 | SYSTEM FOR ESTABLISHING SECURE ACCESS FOR USERS IN A PROCESS DATA NETWORK | Feb. 22, 2016 |
| 6997US1.014033.2616 | 15/049,835 now U.S. Pat. No. 10,026,118 | SYSTEM FOR ALLOWING EXTERNAL VALIDATION OF DATA IN A PROCESS DATA NETWORK | Feb. 22, 2016 |
| 6998US1.014033.2719 | 15/050,094 now U.S. Pat. No. 10,116,667 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 6998USP1.014033.2617 | 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 6999US1.014033.2720 | 15/050,098 now U.S. Patent Publication No. 2017/0213221 | SYSTEM FOR TRACKING AND VALIDATION OF MULTIPLE INSTANCES OF AN ENTITY IN A PROCESS DATA NETWORK | Feb. 22, 2016 |
| 6999USP1.014033.2618 | 62/287,301 | SYSTEM FOR TRACKING AND VALIDATION OF MULTIPLE INSTANCES OF AN ENTITY IN A PROCESS DATA NETWORK | Jan. 26, 2016 |
| 7000US1.014033.2721 | 15/050,084 now U.S. Pat. No. 9,825,931 | SYSTEM FOR TRACKING AND VALIDATION OF AN ENTITY IN A PROCESS DATA NETWORK | Feb. 22, 2016 |
| 7000USP1.014033.2619 | 62/287,298 | SYSTEM FOR TRACKING AND VALIDATION OF AN ENTITY IN A PROCESS DATA NETWORK | Jan. 26, 2016 |
| 7001US1.014033.2620 | 15/050,372 now U.S. Patent Publication No. 2017/0243217 | SYSTEM FOR ROUTING OF PROCESS AUTHORIZATIONS AND SETTLEMENT TO A USER IN A PROCESS DATA NETWORK | Feb. 22, 2016 |
| 7002US1.014033.2621 | 15/050,285 now U.S. Pat. No. 10,318,938 | SYSTEM FOR ROUTING OF PROCESS AUTHORIZATION AND SETTLEMENT TO A USER IN PROCESS DATA NETWORK BASED ON SPECIFIED PARAMETERS | Feb. 22, 2016 |
| 7003US1.014033.2622 | 15/050,292 now U.S. Patent Publication No. 2017/0243209 | SYSTEM FOR GRANT OF USER ACCESS AND DATA USAGE IN A PROCESS DATA NETWORK | Feb. 22, 2016 |
| 7033US1.014033.2638 | 15/050,294 now U.S. Patent Publication No. 2017/0243212 | SYSTEM FOR IMPLEMENTING A DISTRIBUTED LEDGER ACROSS MULTIPLE NETWORK NODES | Feb. 22, 2016 |
| 7038US1.014033.2643 | 15/049,865 now U.S. Patent Publication No. 2017/0244720 | SYSTEM FOR EXTERNAL VALIDATION OF PRIVATE-TO-PUBLIC TRANSITION PROTOCOLS | Feb. 22, 2016 |
| 7039US1.014033.2644 | 15/049,852 now U.S. Pat. No. 10,140,470 | SYSTEM FOR EXTERNAL VALIDATION OF DISTRIBUTED RESOURCE STATUS | Feb. 22, 2016 |

The invention claimed is:

1. A system operatively connected with a block chain distributed network arrangement and for using the block chain distributed network arrangement for facilitating a tiered dedicated block chain configuration, the system comprising:
    a memory device; and
    a processing device operatively coupled to the memory device, wherein the processing device is configured to execute computer-readable program code to:
        establish a plurality of dedicated block chain networks, wherein each of the plurality of dedicated block chain networks is established with a level of security that is distinct from other dedicated block chain networks of the plurality of dedicated block chain networks;
        receive transaction information associated with a transaction;
        determine a transaction factor from the transaction information;
        in response to determining the transaction factor:
        determine a first dedicated block chain network of the plurality of dedicated block chain networks that is associated with the transaction factor, wherein the first dedicated block chain network is associated with a first level of security; and
        generate a new block comprising a record of the transaction, including the transaction information, within the first dedicated block chain network of the plurality of dedicated block chain networks, whereby the record of the transaction is protected by the first level of security.

2. The system of claim 1, wherein the transaction factor is a dollar amount of the transaction.

3. The system of claim 1, wherein the transaction factor is a transaction type associated with the transaction.

4. The system of claim 1, wherein the transaction factor is a merchant type associated with the transaction.

5. The system of claim 1, wherein the transaction factor is a net worth of a merchant associated with the transaction.

6. The system of claim 1, wherein the plurality of dedicated block chain networks are tiered based on a range of transaction amounts associated with each of the plurality of dedicated block chain networks, and wherein a dedicated block chain network associated with a range of transaction amounts that are above a certain transaction amount comprises additional security features than a dedicated block chain network associated with a range of transaction amounts that are below the certain transaction amount.

7. The system of claim 1, wherein the plurality of dedicated block chain networks are tiered based on two or more customer service levels, and wherein a dedicated block chain network associated with a higher customer service level comprises additional security features than a dedicated block chain network associated with a lower customer service level.

8. A computer program product for execution on a system operatively connected with a block chain distributed network arrangement and for using the block chain distributed network arrangement for facilitating a tiered dedicated block chain configuration, the computer program product comprising at least one non-transitory computer readable medium comprising computer readable instructions, the instructions comprising instructions for:
    establishing a plurality of dedicated block chain networks, wherein each of the plurality of dedicated block chain networks is established with a level of security that is distinct from other dedicated block chain networks of the plurality of dedicated block chain networks;
    receiving transaction information associated with a transaction;
    determining a transaction factor from the transaction information;
    in response to determining the transaction factor:
    determining a first dedicated block chain network of the plurality of dedicated block chain networks that is associated with the transaction factor, wherein the first dedicated block chain network is associated with a first level of security; and
    generating a new block comprising a record of the transaction, including the transaction information, within the first dedicated block chain network of the plurality of dedicated block chain networks, whereby the record of the transaction is protected by the first level of security.

9. The computer program product of claim 8, wherein the transaction factor is a dollar amount of the transaction.

10. The computer program product of claim 8, wherein the transaction factor is a transaction type associated with the transaction.

11. The computer program product of claim 8, wherein the transaction factor is a merchant type associated with the transaction.

12. The computer program product of claim 8, wherein the transaction factor is a net worth of a merchant associated with the transaction.

13. The computer program product of claim 8, wherein the plurality of dedicated block chain networks are tiered based on a range of transaction amounts associated with each of the plurality of dedicated block chain networks, and wherein a dedicated block chain network associated with a range of transaction amounts that are above a certain transaction amount comprises additional security features than a dedicated block chain network associated with a range of transaction amounts that are below the certain transaction amount.

14. The computer program product of claim 8, wherein the plurality of dedicated block chain networks are tiered based on two or more customer service levels, and wherein a dedicated block chain network associated with a higher customer service level comprises additional security features than a dedicated block chain network associated with a lower customer service level.

15. A computer implemented method for execution on a system operatively connected with a block chain distributed network arrangement and for using the block chain distributed network arrangement for facilitating a tiered dedicated block chain configuration, said computer implemented method comprising:
    providing a computing system comprising one or more computer processing devices and a non- transitory computer readable medium, where the computer readable medium comprises configured computer program instruction code, such that when said instruction code is operated by said one or more computer processing devices, said one or more computer processing devices perform the following operations:
        establishing a plurality of dedicated block chain networks, wherein each of the plurality of dedicated block chain networks is established with a level of security that is distinct from other dedicated block chain networks of the plurality of dedicated block chain networks;

receiving transaction information associated with a transaction;

determining a transaction factor from the transaction information;

in response to determining the transaction factor:

determining a first dedicated block chain network of the plurality of dedicated block chain networks that is associated with the transaction factor, wherein the first dedicated block chain network is associated with a first level of security; and generating a new block comprising a record of the transaction, including the transaction information, within the first dedicated block chain network of the plurality of dedicated block chain networks, whereby the record of the transaction is protected by the first level of security.

16. The computer implemented method of claim 15, wherein the transaction factor is a dollar amount of the transaction.

17. The computer implemented method of claim 15, wherein the transaction factor is a transaction type associated with the transaction.

18. The computer implemented method of claim 15, wherein the transaction factor is a merchant type associated with the transaction or a net worth of a merchant associated with the transaction.

19. The computer implemented method of claim 15, wherein the plurality of dedicated block chain networks are tiered based on a range of transaction amounts associated with each of the plurality of dedicated block chain networks, and wherein a dedicated block chain network associated with a range of transaction amounts that are above a certain transaction amount comprises additional security features than a dedicated block chain network associated with a range of transaction amounts that are below the certain transaction amount.

20. The computer implemented method of claim 15, wherein the plurality of dedicated block chain networks are tiered based on two or more customer service levels, and wherein a dedicated block chain network associated with a higher customer service level comprises additional security features than a dedicated block chain network associated with a lower customer service level.

* * * * *